July 26, 1949.　　　　　E. E. HUNT　　　　　2,477,484
ROTARY SPEED GRINDER
Filed May 1, 1946　　　　　　　　　　　　2 Sheets-Sheet 1
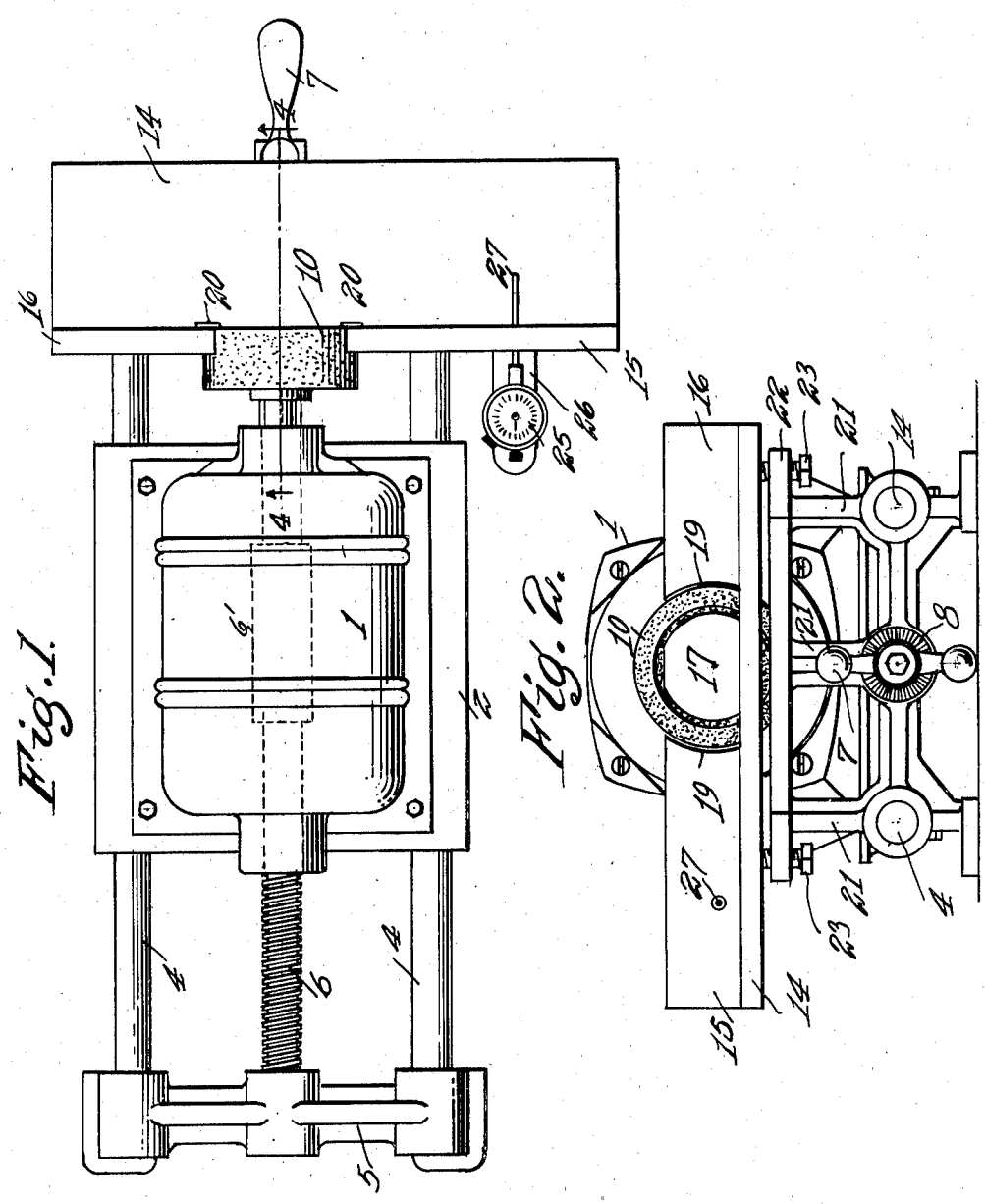
INVENTOR.
Elijah E. Hunt
BY Victor J. Evans & Co.
ATTORNEYS July 26, 1949.　　　　　E. E. HUNT　　　　　2,477,484
ROTARY SPEED GRINDER
Filed May 1, 1946　　　　　　　　　　2 Sheets-Sheet 2
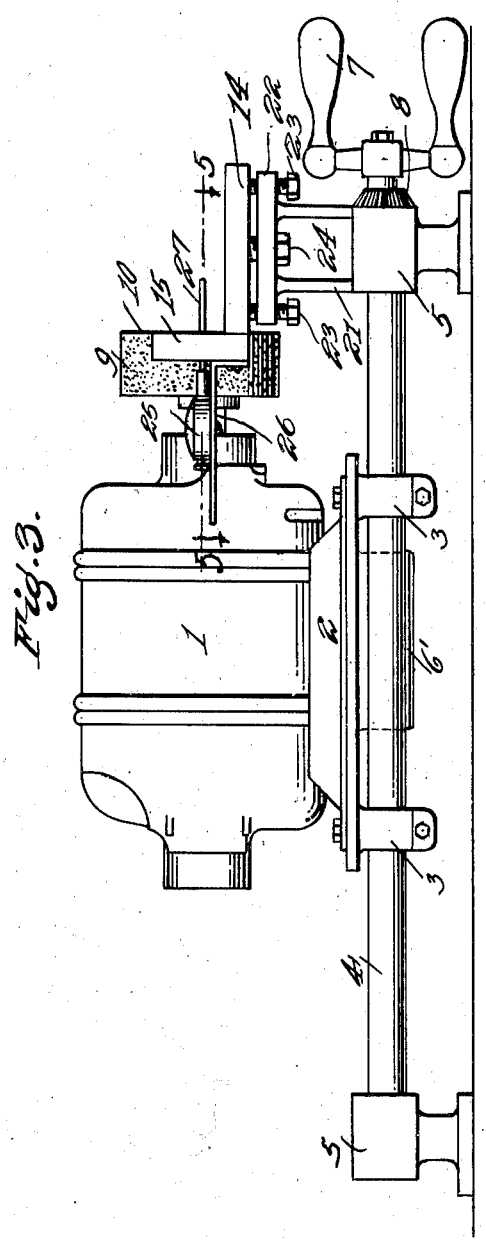
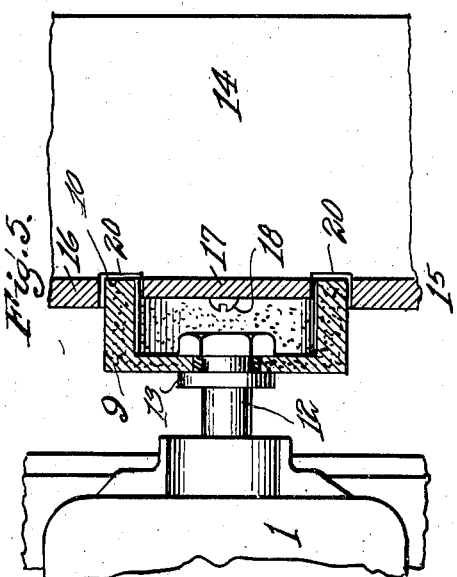
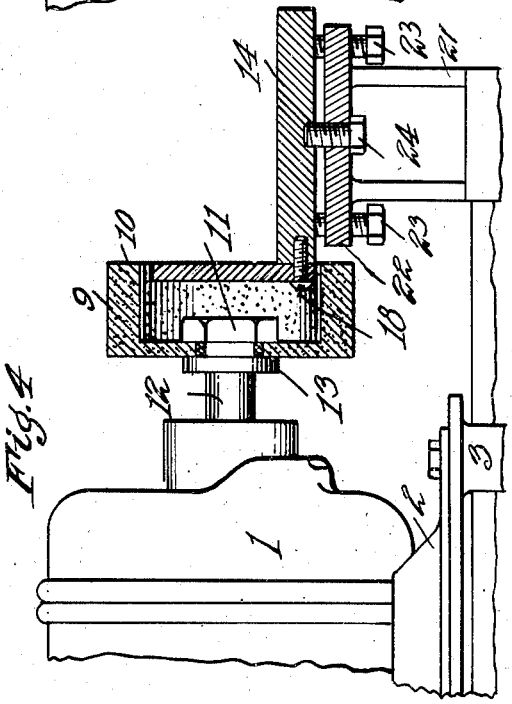
INVENTOR.
Elijah E. Hunt
BY Victor J. Evans & Co.
ATTORNEYS Patented July 26, 1949

2,477,484

UNITED STATES PATENT OFFICE 2,477,484

ROTARY SPEED GRINDER

Elijah Earl Hunt, Albuquerque, N. Mex.

Application May 1, 1946, Serial No. 666,456

1 Claim. (Cl. 51—128)

My present invention relates to an improved rotary speed grinder in the nature of an electrically operated precision machine tool having a rotary abrading disk or grindstone, preferably of the cup-shaped type. While the precision speed grinder of my invention is generally adapted for use with various types of work, it is especially designed for rapid and accurate dressing of automobile connecting-rod caps, and similar work that may readily be controlled and manually fed to the grinding or dressing wheel or polishing face of the rotary tool.

In the process of reconditioning the worn surfaces of the bearing caps of such connecting rods considerable difficulty has been encountered in accurately dressing and finishing the worn surfaces of the caps. The primary purpose of the present invention is the provision of a high-speed machine tool of the grinding type by means of which the caps, and similar work may be smoothly dressed and precisely finished to a desired gage, in a comparatively short period of time. Due to the simplicity in construction and arrangement of parts in the machine tool, the work may manually be fed to the grinding tool with a minimum expenditure of labor, the tool may be adjusted with facility, and the work may be manipulated with convenience in a reliable manner, to insure an accurately finished piece for its intended use.

The invention consists in certain novel combinations and arrangements of parts involving the motor operated grinding or dressing tool, and a combination work-support and guide as will hereinafter be more fully set forth and claimed.

In the accompanying drawings I have illustrated one complete example of the physical embodiment of my invention wherein the parts are combined and arranged according to one mode I have thus far devised for the practical application of the principles of my invention, but it will be understood that changes and alterations may be made in these exemplifying drawings and mechanical structures, within the scope of my appended claim, without departing from the principles of the invention.

Figure 1 is a top plan view of a machine tool embodying my invention, and equipped with a gage for use in dressing work.

Figure 2 is a front end elevation of the machine tool, as seen from the right in Fig. 1.

Figure 3 is a side elevation of the machine tool of Fig. 1.

Figure 4 is a vertical sectional detail view, enlarged, at line 4—4 of Fig. 1; and Figure 5 is a similar, horizontal, view at line 5—5 of Fig. 1.

In the preferred form of the invention disclosed in the drawings I provide a self-contained machine tool or power-operated grinder equipped with an electric motor 1 that is mounted upon a carriage 2 having slide bearings 3, 3, mounted upon the two spaced, parallel, horizontal bars 4, 4, which rigidly connect the front and rear cross castings 5, 5, to form a supporting frame resting upon a bench or other suitable supporting structure.

For use in feeding the carriage with its motor and dressing tool back and forth upon its supporting frame, a rotatable lead screw or screw-bar 6 is located between the two spaced slide bars and passed through a complementary threaded sleeve, bushing, or nut 6' fixed beneath the carriage, and the opposite ends of the screw bar are journaled in suitable bearings of the front and rear castings to permit rotation of the bar, but prevent longitudinal movement thereof.

By means of a hand-wheel 7 fixed on the front protruding end of the screw bar, and a micrometer dial 8, rotatable with the screw bar, the dressing tool may be manually controlled and adjusted or fed with relation to the work for the performance of its required functions.

In this embodiment of the invention I employ a circular cup-shaped grindstone or abrading wheel 9 having a front annular vertically disposed working-face or grinding edge 10, and this recessed wheel or circular disk is rigidly fixed by means of a nut lock 11 threaded upon the end of the motor shaft 12 together with a washer 13.

The work is manually supported, guided and manipulated, in its feed across the front dressing face or working face of the grindstone, and to facilitate this movement of the work while being dressed I utilize a combined angular support and guide extending transversely of the longitudinal axis of the motor and the abrading wheel. The combined angular support and guide is equipped with manually operated means for leveling or vertically adjusting them, as a unit, with relation to the grindstone so that the work may be precisely fed to the finishing tool.

This angular work support and guide includes a flat, rectangular horizontally disposed table 14 having a smoothly finished upper face, and a perpendicular, sectional fence or vertical guide wall, the parts of which are designated as 15, 16, and 17. These sections are attached or rigidly affixed to the table by suitable means, as screws 18, and as best seen in Figs. 1 and 2 the inner, spaced ends of the sections 15 and 16 are curved, as at 19, to form a circular opening in the guide wall concentric with the grindstone and slightly larger in diameter than the exterior periphery of the grindstone. This opening in the guide-wall accommodates the grindstone, and permits it to be fed back and forth with relation to the surrounding walls by manipulation of the handles of the hand wheel 7.

As best seen in Figs. 1 and 5 the rear edge of the table 14 is cut away or recessed, as at 20, 20, and spaced between the opposed arcuate ends 19, 19, of the sectional guide wall, to provide clearance for the annular working face of the grindstone as the latter is manually fed, forwardly, toward the work to be dressed.

The intermediate section, or insert wall 17 is circular in shape with an exterior diameter slightly less than the interior periphery of the annular working face or edge 10 of the grindstone, and as seen in Figs. 4 and 5 this wall section projects into the cup-shaped grindstone so that its front vertical guide face may be initially adjusted flush with the working face of the grindstone.

The front guide faces of the sections of the guide wall are all dressed or finished, accurately, in order that they may initially be adjusted flush with the annular face and for the purpose of accurately guiding the work as it is manually moved across the working face of the grindstone.

To accomplish this adjustment of the combined work support and guide two spaced posts 21, 21, rising from the front casting 5, support a fixed, flat, horizontal, rectangular plate or base 22, and by means of four leveling screws or bolts 23, which are threaded upwardly through complementary holes in the base plate to impinge against the lower face of the table, the latter may be adjusted.

For fixing the adjusted work support and guide in operative position, a pair of spaced clamp bolts 24, 24, are threaded upwardly through the base plate and into the complementary threaded sockets shown best in Fig. 4 in the under face of the table 14.

The work may be gaged during the dressing or finishing operation by means of a rotary gage having an indicator dial 25 and mounted rigidly on a bracket 26 fixed on the back face of the guide wall section 15, and the indicating pin 27, for operating the gage, projects through an opening in the section 15 for ready access to the work for gaging and measuring purposes.

In preparing or setting the machine tool for a dressing operation, the annular working face of the grindstone is initially dressed by means of a special tool or diamond dresser that is moved across the working face while the grindstone is revolving. For this purpose, the motor and carriage are fed forward until the grindstone projects into the opening of the guide wall, as indicated in Figs. 4 and 5. The combined work table and work guide is then squared with the working face of the grindstone, by means of the adjusting screws, to bring the finished faces of the guide-wall sections flush with the working face. The grindstone is then precisely adjusted to bring its working face into the entrances of the two spaced recesses 20, 20, and the motor is activated to rotate the grindstone. While the work is supported on the table and guided by the guide wall it is manually fed across the working face of the grindstone, and the grindstone is gradually fed by use of the hand wheel 7 for polishing, grinding, or dressing the face of the work that contacts with the revolving working face.

The sections 15, 16 and 17, of the guide wall form a continuous guide for the work extending the full length of the table, and as the work is always and constantly guided by the fence or wall and supported by the table precision grinding of the work is thus assured.

Having thus fully described my invention, what I claim as new and desire to secure by Letters Patent is:

In a machine tool having a frame including a pair of spaced supporting members, a pair of horizontally disposed bars fixed at their opposite ends to said members, a carriage slidably mounted on said bars and having an electric motor fixed thereto, a feed screw rotatably journalled at its opposite ends in said members and extending longitudinally of the bars intermediate thereof and having engagement with an internally threaded sleeve fixed to the bottom of said carriage, the improvement comprising a micrometer dial on said feed screw fixed to one of said members, and a hand wheel on the end of said feed screw adapted to coact with said dial for the adjustment of said carriage, a guide means mounted on one of said members above said hand wheel, means carried by said last member and coacting with said guide means for the adjustment thereof, a cup-shaped grinding wheel on said motor receivable in recesses provided in the rear edge of said guide means and said guide means having indicating means thereon adapted to determine the adjustment of said guide means with relation to said grinding wheel.

ELIJAH EARL HUNT.

REFERENCES CITED

The following references are of record in the file of this patent:

UNITED STATES PATENTS

| Number | Name | Date |
|---|---|---|
| 98,028 | Chattaway et al. | Dec. 21, 1869 |
| 926,101 | Connet | June 29, 1909 |
| 1,296,979 | Lindsay | Mar. 11, 1919 |
| 1,420,323 | La Rock | June 20, 1922 |
| 2,248,953 | Bunch | July 15, 1941 |
| 2,289,693 | Blazek | July 14, 1942 |
| 2,318,764 | Dorris | May 11, 1943 |
| 2,325,826 | Barrett | Aug. 3, 1943 |
| 2,328,650 | Johnson et al. | Sept. 7, 1943 |
| 2,421,180 | Barrett | May 27, 1947 |

FOREIGN PATENTS

| Number | Country | Date |
|---|---|---|
| 331,692 | Great Britain | July 10, 1930 |
| 742,084 | France | Dec. 21, 1932 |
| 846,800 | France | June 19, 1939 |